(12) United States Patent
Fisk et al.

(10) Patent No.: US 7,003,506 B1
(45) Date of Patent: Feb. 21, 2006

(54) METHOD AND SYSTEM FOR CREATING AN EMBEDDED SEARCH LINK DOCUMENT

(75) Inventors: Eric McKee Fisk, Seattle, WA (US);
Dean Alan Slawson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 09/602,305

(22) Filed: Jun. 23, 2000

(51) Int. Cl.
*G06F 17/30* (2006.01)

(52) U.S. Cl. .............................. 707/1; 707/10; 715/513
(58) Field of Classification Search ................... 707/3, 707/5, 4, 10, 1, 100, 101, 201, 203; 709/217; 701/211; 434/118; 715/513
See application file for complete search history.

(56) References Cited

U.S. PATENT DOCUMENTS

| | | | | |
|---|---|---|---|---|
| 5,222,234 A | * | 6/1993 | Wang et al. ................... | 707/3 |
| 5,321,833 A | * | 6/1994 | Chang et al. .................. | 707/5 |
| 5,812,999 A | * | 9/1998 | Tateno ........................... | 707/3 |
| 5,987,454 A | * | 11/1999 | Hobbs ........................... | 707/4 |
| 6,347,943 B1 | * | 2/2002 | Fields et al. ................. | 434/118 |
| 6,427,145 B1 | * | 7/2002 | Hara et al. ...................... | 707/3 |
| 6,539,382 B1 | * | 3/2003 | Byrne et al. .................. | 707/10 |
| 6,650,998 B1 | * | 11/2003 | Rutledge et al. ............ | 701/211 |
| 2001/0044833 A1 | * | 11/2001 | Eisendrath et al. ......... | 709/217 |

* cited by examiner

*Primary Examiner*—Mohammad Ali
*Assistant Examiner*—Etienne P LeRoux
(74) *Attorney, Agent, or Firm*—Ronald M. Anderson (57) ABSTRACT

A method and system for creating and using an embedded search link document. Embedded search link documents are search-enabled through the use of a wizard. The wizard initially prompts a user to open an HTML-formatted genesis document in an editing pane. Once the genesis document is loaded, the user may add and manipulate search links by customizing the relevant search parameters. The invention permits a user to tailor a search by selecting various search parameters describing the search objective. Once the search parameters are specified, the search engine finds documents meeting the search criteria from a catalog that was built by crawling World Wide Web sites. These documents are filtered for relevance and compiled into a results list. The documents comprising the results list are placed into one of a set of site catalogs, depending on which of the search criteria are embodied in the individual document. The results list is returned to the user, who may designate certain links as preferred links. These preferred links will be compressed and stored, and will always show up at the top of the search results list. Similarly, the search criteria are compressed and stored as a portion of the search link embedded within the genesis document. Once the user has created all desired search links, the genesis document is saved as an embedded search link document. Later users may initiate searches by accessing an embedded search link.

32 Claims, 9 Drawing Sheets

Embedded Search Link Document Generation System 10

METHOD AND SYSTEM FOR CREATING AN EMBEDDED SEARCH LINK DOCUMENT

TECHNICAL FIELD

The invention relates generally to the field of information searching and analysis, and more particularly to an embedded search link document generation system for an Internet access-enabled personal computer.

BACKGROUND OF THE INVENTION

Early attempts at cataloging information resulted in inventions such as the card catalog, the Dewey Decimal system, and the index. With the advent of electronic storage, advances such as the database and online indexing were invented. A common method for retrieving relevant information is embodied in the form of a World Wide Web hyperlink. Certain websites, in response to submitted search criteria, will retrieve relevant web pages from the Internet and submit hyperlinks leading to those web pages to a user.

However, a user reading a specific document, who wishes to find information related to the contents of the document, must locate a website containing a search engine, formulate a query, submit the query, and wade through irrelevant documents sorted only by keyword in order to find truly useful information. In many cases, properly submitting a search to capture an underlying concept is extremely difficult with a modern Internet search engine. Further, a user may waste a colossal amount of time formulating the search, locating an appropriate search engine, and wading through the plethora of results before desired information is located. Additionally, the search results returned by an Internet search engine may bear little or no relevance to the points raised by the document author, either due to limitations in the engine or difficulty in formulating the search.

In order to provide more direct access to related information, document authors often include in their document a hyperlink to other documents. This methodology also has drawbacks. If the target hyperlink (also known as a "uniform resource locator", or "URL") is removed from the web, the link will point to a site that no longer exists. Additionally, links can only reference a single target, often requiring the author to devise a separate web page that is simply a list of hyperlinks to related sites. The final problem with direct links is that sites that are unknown at the time of authoring cannot be referenced. The longer a document remains online, the more likely its hyperlinks will become "stale"—pointing to old or missing sites.

Thus, there is a need in the art for an improved method for quickly retrieving information from the Internet. There is a further need for a search technique which combines the strengths of the authored hyperlink with the search engine. There is a final need for a search engine offering up-to-date hyperlinks containing an author's knowledge of good web resources.

SUMMARY OF THE INVENTION

Generally stated, the present invention is directed to a method and system for building an embedded search link document. First, a methodology is used to identify documents which fit a pattern. This pattern matching leads to the creation of a searchable document set. The search engine is then accessed using "search links" which combine the strengths of a search engine and a user-authored hyperlink in leading a document viewer to related documents. In the exemplary invention, the pattern being identified is a lesson plan and the search links are designed by curriculum administrators for use by teachers. The methodology could, however, be applied to other knowledge domains and the two parts used separately.

The search engine may be accessed like any other Internet search engine, but is designed to contain documents of a specific nature. Initially, documents matching a loose Boolean query are retrieved by a general search engine. These documents are then cataloged and searched iteratively using a complex Boolean query to arrive at a second set of documents fitting a more rigorous pattern. This second set of documents may then be searched based on another characteristic. A particular strength of the methodology is that it may be applied to any search engine using common Boolean query syntax.

Search links may be used to access additional documents, or other sources of information, which relate back to data in the embedded search link document. A user may create a search link through the use of a document editor. The search link embodies a specific set of search criteria which reflect concepts to which the user wishes a reader to have access. Throughout this document, the example of an administrator creating an embedded search link document in the form of an HTML curriculum standards document will be used, although embedded search link documents may come in many other forms.

Two end users are targeted by the exemplary embodiment of the invention: administrators and teachers. Typically, administrators create the embedded search link document, while teachers employ the embedded search link document in order to retrieve appropriate lesson plans.

In order to create an embedded search link document, a genesis document in HTML format is first loaded. In the exemplary embodiment, the genesis document is typically a curriculum standards document). The user then selects a location in the document where he wishes to place a search link. He then specifies search criteria for the link using an advanced search engine user interface (UI). The user refines the query until a reasonable set of documents is returned.

The filtered document set is then presented to the user, who may designate one or more documents in the set as a "preferred link." Preferred link documents will always be returned when the associated embedded search link is activated. Preferred links may be designated at the time the associated embedded search link is created or modified.

Once all preferred links are designated the result is encoded and saved as the target of a hyperlink, which is referred to as a "search link". The target of the search link is a domain specific search engine along with all the search parameters the author specified (e.g. grade level, subject, keywords, preferred document URLs). Preferred document URLs are compressed and stored along with the embedded search link document while other search results are not.

An end user (for example, a teacher) may use an embedded search link document to retrieve search results from a site catalog. The end user opens the embedded search link document, and accesses a search link, which may appear as an ordinary hyperlink link. The search engine then retrieves all documents matching the search criteria specified for that search link. If any preferred links are associated with the embedded search link, the preferred links are displayed on the top of the results list, or otherwise indicated as preferred to the end user. Since the results are returned by the search engine, the user may either follow a link or alter the author devised search to get a different result set. Note that in the exemplary embodiment of the invention the preferred links are not applied when the search is altered by the user.

In the exemplary embodiment, teachers may use the Lesson Connection Search feature to retrieve additional possible lesson plans. The Lesson Connection Search presents a teacher with a simple, online user interface for rapid retrieval of HTML documents containing information relevant to selected topics. A teacher may specify a subject, topic, keyword, and target grade level in order to initiate a search. The Lesson Connection Search interface then retrieves a set of Web pages corresponding to the search criteria, and presents the teacher with a hyperlinked list containing the retrieved pages. The teacher may then freely browse each page for relevance.

That the invention improves over the drawbacks of prior document classification systems and accomplishes the advantages described above will become apparent from the following detailed description of the embodiments and the appended drawings and claims.

DETAILED DESCRIPTION

General Summary of the Embodiment

The present invention may be embodied in an embedded search link document generation system that is generally directed to a method and system for building and using a search enabled curriculum standards document. Although the specific example of a search enabled curriculum standards document will be discussed, many types of embedded search link documents may be created through the use of the current invention. For example, an alternate embodiment may permit a user to create an embedded search link document listing all available songs performed by a certain artist from a music catalogue, or all books corresponding to a Dewey Decimal number within a library, and so on. The results of the search may be any type of resources and need not be documents. In the exemplary embodiment, two end users are targeted by the invention: curriculum administrators (administrators) and teachers.

An administrator may create a search-enabled curriculum standards document for discovery and use by teachers. Curriculum standards documents (CSD) are commonly used by administrators to define learning objectives by subject for students in a given grade, and may serve as the basis for developing lesson plans for use by teachers. CSDs may be organized according to a taxonomy developed by the Gateway to Educational Materials Committee, colloquially referred to as "GEM." GEM breaks each CSD and attendant lesson plan up by subject, topic, and grade level. The subject of a lesson plan is also referred to as L1 (level one), and is the broadest categorization of the document. The topic is also referred to as L2 (level 2 topic) in this embodiment of the GEM system, and is a subcategory of the subject. Each L1 entry has multiple L2 entries. Finally, the grade level dictates a specific grade or range of grades to which a lesson plan corresponds.

Curriculum standards documents are search-enabled through the use of a wizard. The wizard initially prompts an administrator to open an HTML-formatted curriculum standards document in an editing pane. Once the CSD is loaded, the administrator may add and manipulate search links. Search links connect the CSD to a dynamic search results list. That is, the clicking the search link initiates a new search with each click, rather than directing a user to an unchanging, stored list of results.

A search link is generated by customizing the relevant search parameters. On a general level, the wizard permits an administrator to tailor a search by selecting a topic from a list of classroom subjects; target grade levels; and specific keywords describing the curriculum objective (note that in other applications different metadata may be used with a similar approach). Once the search link parameters are specified, the search engine finds documents meeting the search criteria from a catalog that was built by crawling World Wide Web sites. The results list is returned to the administrator, who may designate certain links as preferred links. Preferred links typically lead to lessons that best reflect the stated learning objectives. These preferred links will be compressed and stored in the CSD, and when viewed in the form of search results show up at the top of the search results list. Similarly, the search criteria are compressed and stored along with the CSD, so that later users clicking on a search link may initiate the search intended by the administrator.

More specifically, the search engine conducts its crawl according to a specified subject and crawl depth. The subject corresponds to the topic selected by the administrator, while the crawl depth is an expression of how far out from a given document the engine should search. Crawl depth is limited by both number of site jumps and number of link jumps the engine may initiate before terminating the search.

Once documents are located by the engine, all HTML, PDF, and Microsoft OFFICE documents are parsed. The URL, document title, text, and document description for each discovered document is retrieved. These retrieved sites are compiled into a searchable catalog. A Boolean filter is constructed to analyze each page of the catalog, in order to determine which pages contain information valuable to the proposed lesson plan. Words contained in the Boolean filter may be either positive or negative.

Positive words identify documents that may be of use in a lesson plan, while negative words indicate false hit documents. These positive and negative words are organized into logical groups that identify characteristics. Each group is run through a query analyzer to determine which groups exclude the largest number of documents contained in the catalog. Groups are analyzed in order of filtering impact. Every term in a group is individually analyzed for inclusion or exclusion of a document based on its presence within the document. In particular, "boundary" documents which are included or excluded by a single term are evaluated in order to assess the validity of that term. This process may be filtered and repeated until a final result set is generated and presented to the administrator, who may then include the results in a search link as detailed above.

Once the final CSD is prepared and saved in an HTML format, it is published as a Web page by the administrator. This permits proper functioning of the search links, as well as possible retrieval by a teacher using the Lesson Connection Website.

In addition to using curriculum standards documents prepared by administrators using the wizard, teachers may use the Lesson Connection Search feature to retrieve additional possible lesson plans. The Lesson Connection Search presents a teacher with a simple, online user interface for rapid retrieval of HTML documents containing information relevant to selected topics. A teacher may specify a subject, topic, keyword, and target grade level in order to initiate a search. The Lesson Connection Search interface then retrieves a set of Web sites corresponding to the search criteria, and presents the teacher with a hyperlinked list containing the retrieved sites. The teacher may then freely browse each site for relevance.

Exemplary Operating Environment

Figure 1:
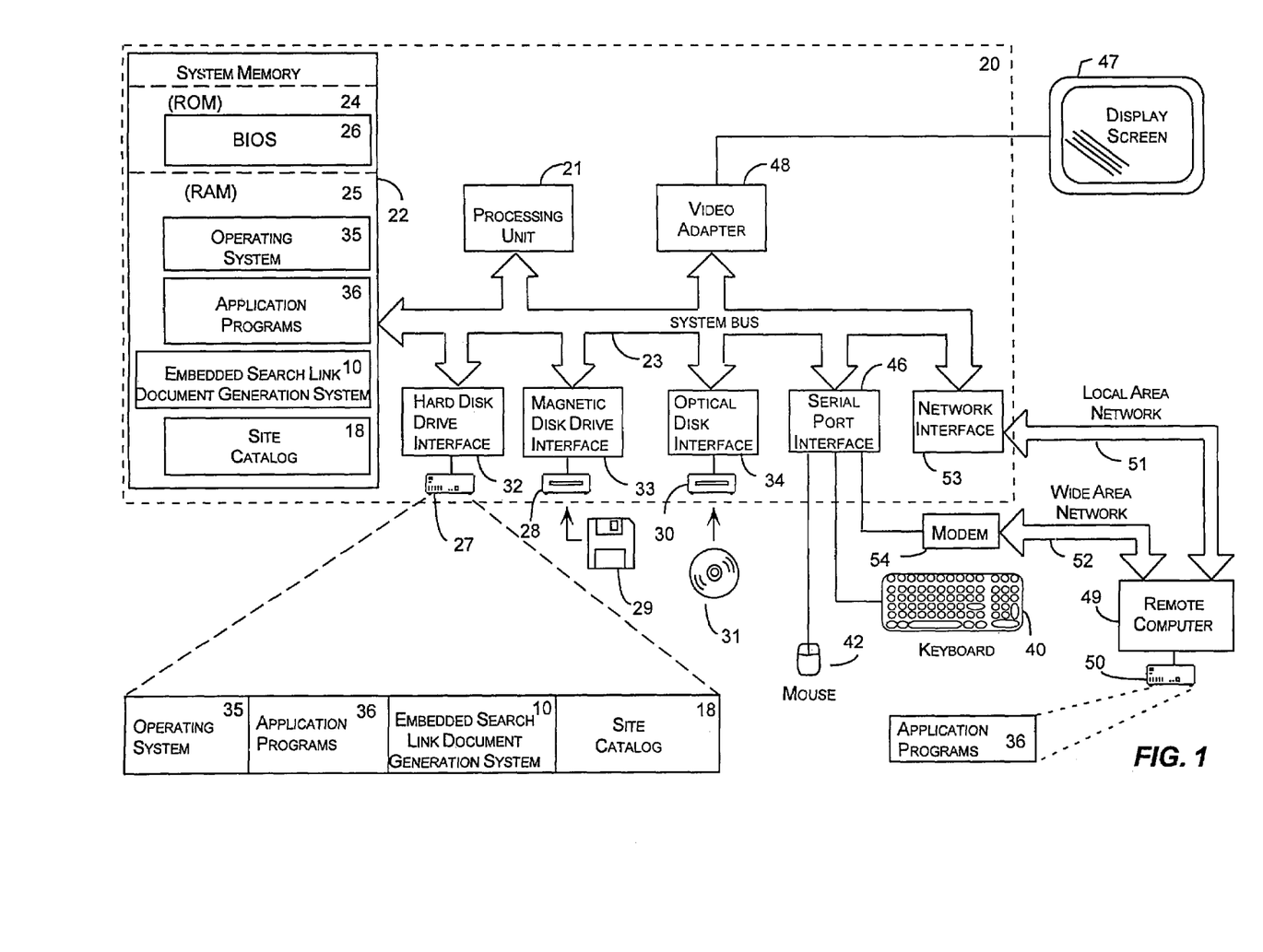
FIG. 1 is a block diagram of a personal computer that provides an exemplary operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a web browser program 37, and program data 38. A user may enter commands and information into the personal computer 20 through conventional input devices, including a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display screen 47 or other type of display device is also connected to the system bus 23 via an interface, such as a video adapter 48. In addition to the display screen 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

Operation of the Embedded Search Link Document Generation System

Figure 2:
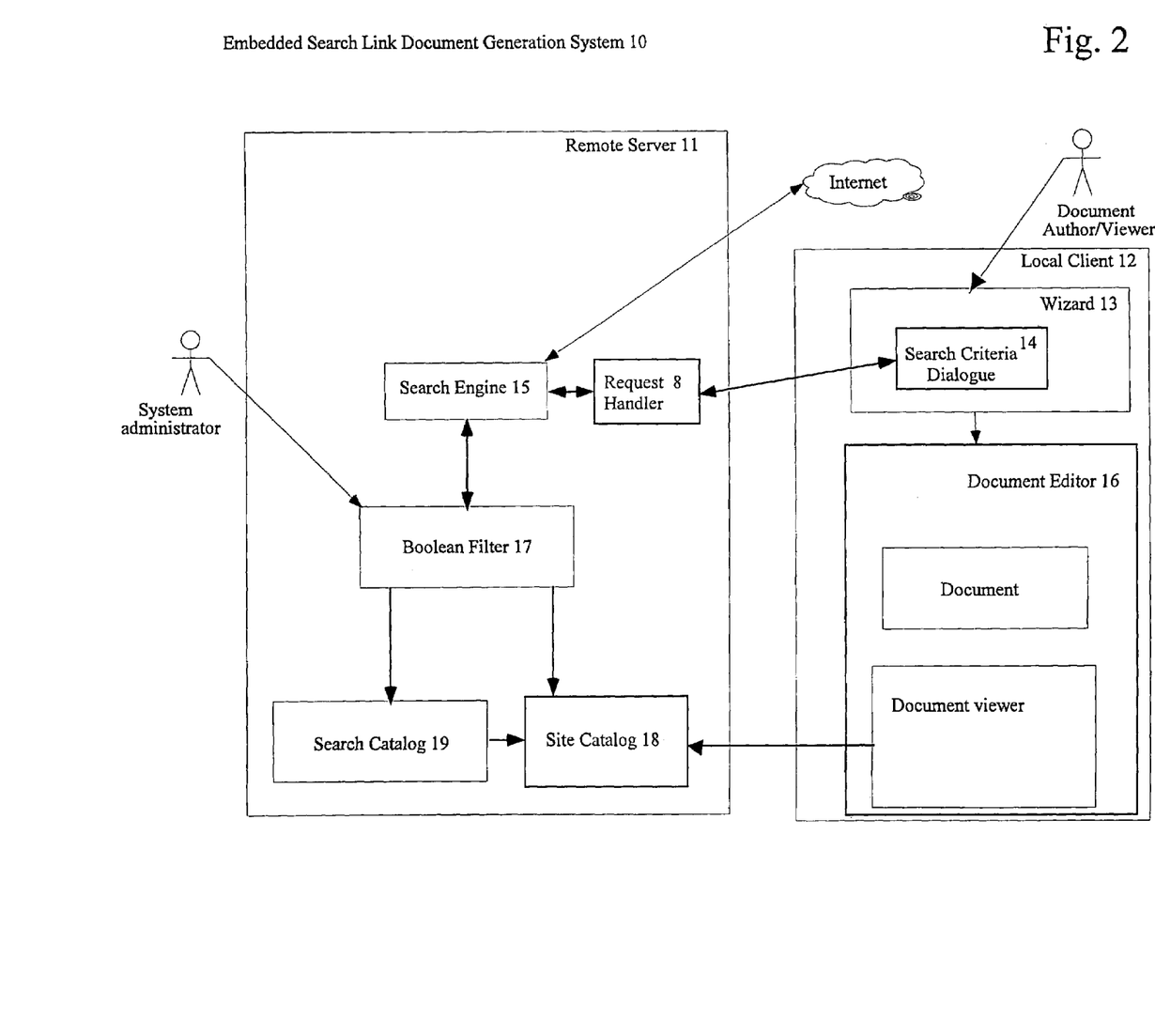
FIG. 2 is a system diagram of an exemplary embodiment of the present invention.

FIG. 2 displays the embedded search link document generation system 10. Briefly described, the embedded search link document generation system 10 permits a user to create search links which, when accessed, initiate data queries in order to return information relevant to the subject of the queries. These search links may then be embedded in a document, such that when a user accesses the link within the document, the results are seamlessly returned, rather than forcing a user to access a distinct web browser or other program in order to initiate a search on a topic contained within the document.

In the exemplary embodiment, the embedded search link document generation system 10 consists of a remote server 11 and a local client 12. The remote server 11 initiates searches and classifies search results, while the local client 12 serves as a document editor and user interface. Typically, the remote server is located on a remote computer and the local client is located on the user's computer, although this may vary in alternate embodiments.

The remote server 11 further consists of a request handler 8, a search engine 15, a Boolean filter 17, a site catalog 18, and a set of search catalogs 19. The request handler 8 receives search requests and search criteria from the local client 12, and translates these requests into a format accessible by the search engine 15. The search engine 15 processes search requests initiated by the search criteria dialogue 14 and passed on by the request handler 8. Depending on the nature of the search request, the search engine may either retrieve relevant documents from the Internet, or retrieve relevant documents from the site catalog 18. The site catalog 18 is essentially a compilation of all documents found by the search engine 15 and determined by the Boolean filter 17 to be relevant to potential search requests received from the search criteria dialogue 14. In alternate embodiments, the search engine 15 may be a third party search engine located outside the remote server 11. For example, many freely available World Wide Web search engines may perform the tasks described with respect to the search engine 15. Note also that the functions attributed to the remote server 11 may be distributed across one or more computers in alternate embodiments. For example, the search catalog 19 and site catalogs 18 may be located on a remote web server, while the boolean filter 17 and search engine 15 remain on the remote server.

Each time the search engine 15 searches the Internet, the Boolean filter 17 analyzes the search results, and compiles all relevant documents into a search catalog 19. The individual search catalogs 19 are stored in the remote server 11 and are further classified into a series of site catalogs 18, so that search results may be quickly and easily retrieved without necessitating additional Internet searches.

The local client 12 consists of a search criteria dialogue 14 and a document editor 16. The search criteria dialogue and document editor may be contained within a wizard 13, although this is not necessary. Similarly, the document editor 16 typically contains some form of document viewer 9, although standalone web borwsers may also serve as document viewers. As with the remote server 11, the functionality ascribed to the local client 12 may be distributed across multiple computers. For example, the wizard 13 may be contained on a document author's computer, while the document viewer 9 may be on yet another computer and used by a third party.

The wizard 13 provides a convenient structure for creating an embedded search link document. Generally speaking, a user may load a document into the document editor 16 in order to review the document and choose search link insertion points. Once the user determines the proper position for a search link, he may employ the search criteria dialogue 14 to specify the parameters which the search link will observe, and to retrieve a list of potential responses to the proposed search link's query. As mentioned above, the exemplary embodiment retrieves the potential responses by passing the search link criteria to a request handler 8, which in turns determines what results located in the site catalogs 18 match the criteria. Alternate embodiments may retrieve potential responses directly from the Internet.

Once the embedded search link document system 10 presents the user with a list of potential responses, the user may select preferred links from within the list, and may insert search links into the document as desired. The concepts of preferred links, search links, and document editing are further discussed below.

Creating a Search Catalog

The first step in creating an embedded search link document within the embedded search link document generation system 10 is to refine a search catalog 19. The embedded search link document generation system 10 initially creates a search catalog through the use of a search engine 15. Once the search catalog is created, future searches simply poll the search catalog for results, rather than continuously sampling unknown World Wide Web sites. Thus, the search catalog 19 serves to minimize the length of time required to initiate a search, as well as providing quality control over search results, insofar as the contents of the search catalog may be monitored and altered by a user in order to eliminate marginally useful documents.

In order to create a search catalog 19, the search engine 15 initially downloads a number of Internet sites, starting at central "hub sites" and working outward through the use of World Wide Web or other Internet links. This process is typically referred to as "crawling" the Web. In the exemplary embodiment, the search engine retrieves and processes all discovered HTML, Adobe ACROBAT (.PDF extension), and Microsoft OFFICE documents in order to create the search catalog 19, although alternate embodiments may allow different file formats to be processed. For example, text files, sound files or image files may also be processed by an embodiment of the embedded search link document generation system 10.

"Hub sites" are Web sites that index various contents. That is, hub sites contain multiple links to other Web sites. In order to qualify as a hub site, a Web site must contain at least one link to another Web site which is of relevance to a particular lesson plan. Thus, for example, a Web site containing multiple links detailing different styles of painting and artists within each style may be a hub site, while a Web site containing a set of comic book links may not. Hub sites may either be found through the independent operation of the search engine 15, or may be retrieved by inputting a query into a traditional, existing World Wide Web search engine. For example, the search engine 15 may crawl across various links until a specific number of hub sites are located, or may pass along a user's query to an existing Web search engine, and determine the location of various hub sites from the results returned. Note that, throughout this discussion, the term "web site" is intended to encompass not only HTML-enabled Internet pages, but also any file that may be retrieved by the search engine during its crawl. For example, Adobe ACROBAT and Microsoft OFFICE documents are embraced within the meaning of the term "web site" as used herein.

Once a hub site is identified, the embedded search link document generation system 10 determines a "subject" and a "crawl depth" for each hub site. The subject is derived from the main content of the hub site (or its constituent links), and is one of the L1 level GEM entries. For example, a hub site may have an associated "Mathematics", "Art", or "History" subject. The "crawl depth" for a hub measures how far the search engine 15 should travel in search of relevant information. Crawl depth is made up of two separate parameters, a site jump number and a link jump number. The site jump number states how many unique top level domains may be accessed before terminating the search. Similarly, the link jump number indicates how many sites within a top level domain may be viewed before a search terminates. Each is a single number. For example, the search engine 15 might take the following path to retrieve a document relating to the concept of "adding fractions":

a. From hub "abc.com" to site "math.com";
b. From site "math.com" to site "addition.com";
c. From main site "addition.com" to sub-site "addition.com/fractions.".

This would constitute two site jumps (steps a. and b.), and one link jump (step c.) If the crawl depth specified a site jump number of 1, then the search would terminate after step a, and the site "addition.com/fractions." would not be located.

Creating a Site Catalog

Once retrieved, the various web sites comprising the search catalog 19 are compiled into a searchable form by the remote server 11. The embedded search link document generation system 10 converts the file format of all retrieved documents within the search catalog 19 to a default format, readable by the remote server 11. Ultimately, each page within the search catalog 19 will either be discarded, or assigned to a site catalog 18 corresponding to a particular subject and grade level. The Boolean filter 17 may analyze each page within a search catalog individually. The Boolean filter may further be refined through expert analysis and classification undertaken by a site administrator, who may adjust the values and terms analyzed by the filter to match his preferences.

The Boolean filter's objective is to eliminate documents which may strictly match the search parameters, but which are unlikely to yield information useful in the context of a lesson plan. For example, a lesson plan involving history may focus on George Washington's camp at Valley Forge. Depending on the search parameters, documents such as an online brochure for the Valley Forge chamber of commerce may be retrieved. The Boolean filter 17 attempts to separate actual lesson plans from commercial web sites, standards documents, college thesis papers, magazine articles, and other documents of minimal relevance.

Initially, the Boolean filter 17 performs a heuristic search of all lesson plans in order to determine what words identify lessons (positive words), and what words identify other types of documents (negative words). For example, the Boolean filter 17 may determine that the phrase "students will" identifies a lesson plan. Similarly, the Boolean filter may determine that the phrases "customer service" and "mission statement" indicate irrelevant documents that may be excluded when returning search results.

The Boolean filter 17 then groups positive words and negative words within logical groups. In the exemplary embodiment, the following logical groups exist:

True_Lessons
True_Body
True_Student
False_College
False_Commercial 1
False_Commercial 2
False_Form
False_HubSite
False_Message
False_Outline, and
False_Standards.

For a document to be relevant to a search, it must contain at least one term found within each true group, and no terms found within a false group. In other words, a document is only potentially relevant (and therefore included in the site catalog 18) if at least one true term exists, and no false terms exist within the document.

In Boolean algebra, the final query is of the form $(A_1 + A_2 + \ldots + A_N)(B_1 + B_2 + \ldots + B_3) \ldots !(F_1 F_2 \ldots F_N) \ldots$, where A and B are truth terms and F is a set of rejection terms. The data may be inverted for a particular term or group using common Boolean algebra (e.g. DeMorgan's laws).

The Boolean filter 17 may then determine which of the groups excludes the greatest number of documents. Each group is then individually analyzed on a term-by-term basis, in order to determine whether a specific term is incorrectly including documents which should be ignored, or incorrectly excluding documents which are potentially relevant. Documents are then excluded by group. In the event that a document is incorrectly excluded, a user may revise the group which excluded the document by eliminating a particular filtering term (in the case of a false group) or adding a particular filtering term (in the case of a true group) in order to correct the Boolean filter 17. Terms which minimally impact this refining process are eliminated from all groups, in order to maintain a manageable filter size.

The Boolean filter results are then further filtered according to subject and grade range. Each potentially relevant document will be assigned a subject and a grade range, and will be placed in the corresponding site catalog 18. One site catalog exists for each combination of subject and topic. By contrast, a search catalog is created every time a new search is initiated. The set of site catalogs serves as the search basis for users accessing search links within an embedded search link document.

Creating an Embedded Search Link Document

Once the embedded search link document generation system 10 creates a set of site catalogs 18, a user may begin the process of creating an embedded search link document. In the exemplary embodiment, the user begins this process by running or otherwise accessing the wizard 13.

The wizard 13 walks the user through the process of creating and inserting search links by presenting a series of screens to the user, each with different functionality. Each screen of the wizard 13 will be discussed in turn, and an ongoing example will be used to illustrate the processes associated with the various screens.

Figure 3:
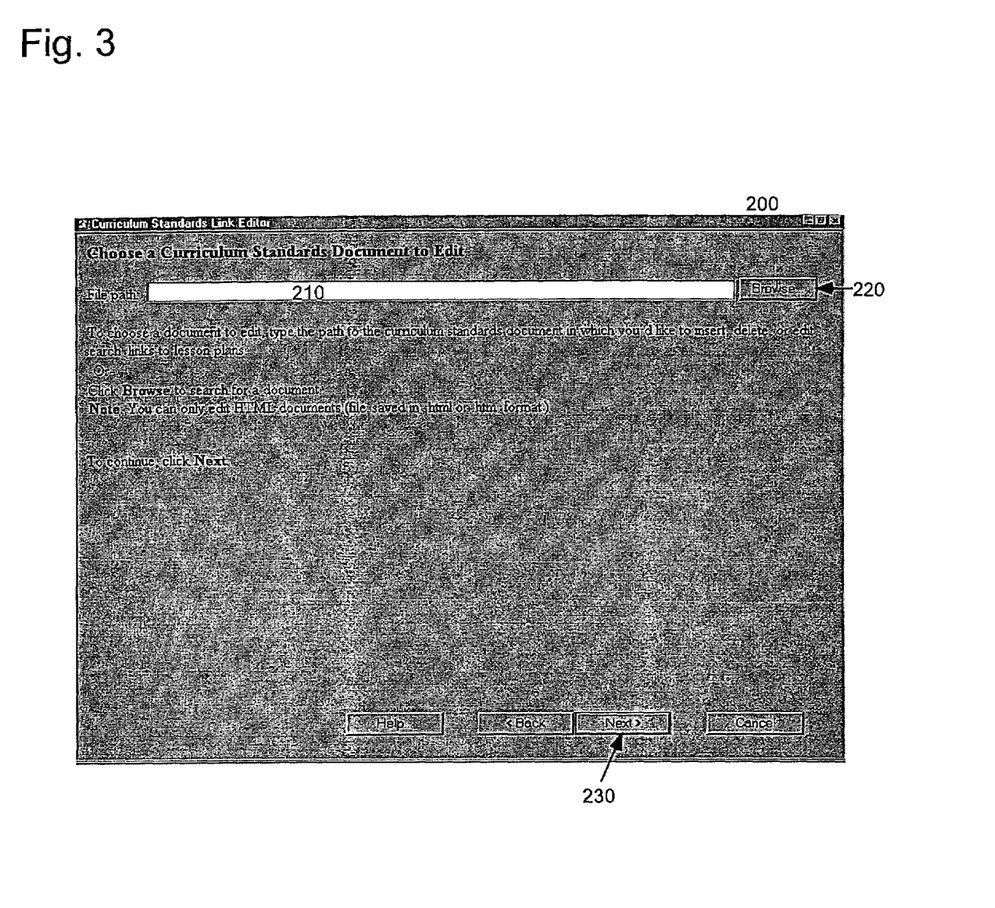
FIG. 3 depicts a screen display in accordance with an embodiment of the present invention.

FIG. 3 displays the open file screen 200. From this screen, a user may select the document into which he wishes to embed search links. This document is referred to as the "genesis document". The open file screen 200 includes a file path box 210, a browse button 220, and a next button 230. The user enters the location from which he wishes to retrieve the genesis document (in this example, a CSD) in the file path box 210. Alternately, the user may locate the CSD by pressing the browse button 220. Pressing the browse button opens a new window displaying the file path specified in the file path box 510, and showing all files present at this location. In the exemplary embodiment, the user is also provided with a graphical means for moving about the file structure in order to specify the location from which to open a document. Once the document to be edited is located, the user depresses the next button 230 to enter the file editing screen.

Figure 4:
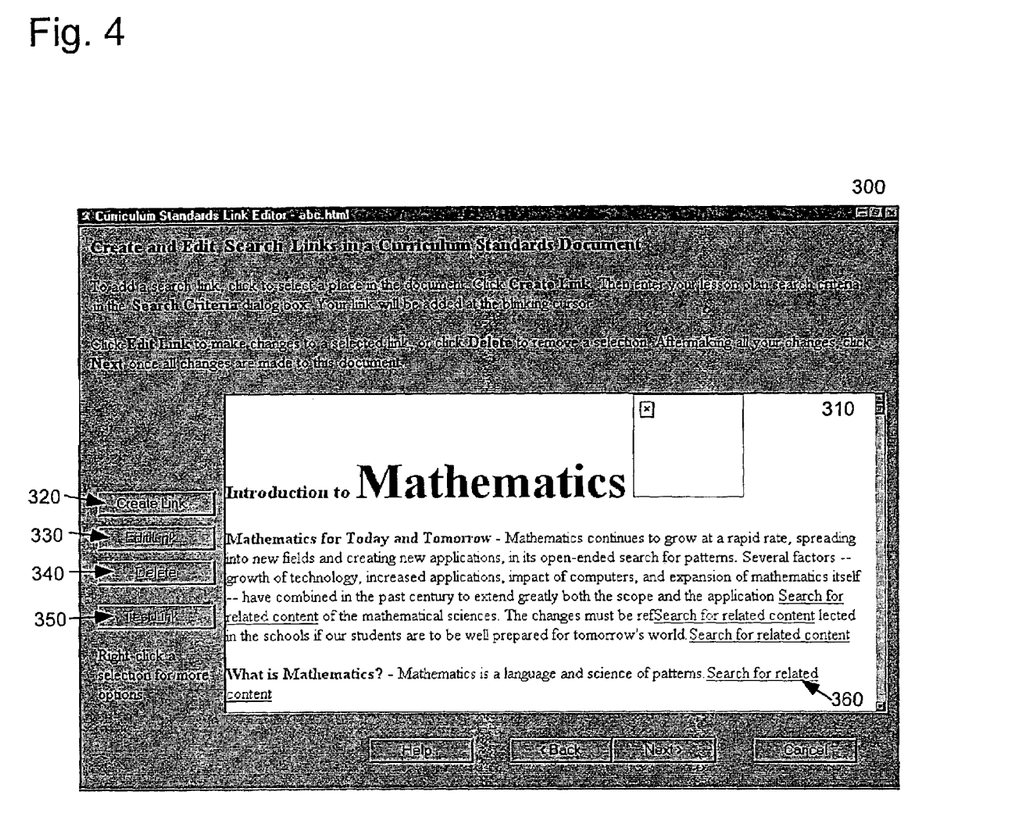
FIG. 4 depicts a screen display in accordance with an embodiment of the present invention

FIG. 4 displays the file editing screen 300. In the exemplary embodiment, the file editing screen is accessed through the wizard 13 and embodies the document editor 16. The file editing screen consists of an editing pane 310, a "create link" button 320, an "edit link" button 330, a "delete link" button 340, and a "test link" button 350. When a user first accesses the file editing screen 300 in the exemplary embodiment, the text cursor is present in the upper leftmost corner of the editing pane 310. This signifies that the embedded search link document generation system 10 is prepared to edit the chosen document. In our example, the embedded search link document generation system 10 displays the mathematics curriculum standards document chosen by the user in the editing pane 310.

When the cursor is placed above the editing pane 310, it becomes a standard text cursor, or "I-bar" cursor. When the user clicks a space inside the editing pane, the embedded search link document generation system 10 inserts a blinking cursor at the point selected. In the exemplary embodiment, right-clicking within the editing pane 310 will activate the contextual menu, as discussed below.

The user may select text displayed within the editing pane 310, with any inserted search links 360 being treated as text for selection purposes. Text may then be edited in a manner similar to that of a basic word processor.

If the user single clicks a search link 360, the search link will be selected. The user may then "drag and drop" the search link. A user performs a drag and drop operation by selecting a search link 360, holding down the mouse button, moving the cursor and releasing the mouse button. If the user terminates a drag and drop operation outside the editing pane 310 while a search link 360 is selected, the embedded search link document generation system 10 will generate a dialogue box requesting that the user confirm search link deletion. That is, dragging and dropping a search link 360 outside the editing pane will result in deletion of the search link. Double clicking a search link initiates the edit dialogue, while double clicking a blank space within the editing pane initiates the insert dialogue for the double clicked area. The edit dialogue and insert dialogue are discussed below.

Four buttons control the creation and use of search links within the embedded search link document generation system 10. These buttons are displayed on the left-hand side of the file editing screen 300, and are respectively the "create link" button 320, the "edit link" button 330, the "delete link" button 340, and the "test link" button 350. Each button is enabled under different circumstances. The "create link" button is always enabled if a cursor is present within the editing pane 310. The "edit link" button is only enabled when the user has selected a single link, either standing alone or within a block of text. The "delete link" button is enabled when anything within the editing pane is selected, whether that be text, a link, or both.

The "create link" button 320, when depressed, initiates the search criteria dialogue. If the "create link" button is pressed while text is selected within the editing pane 310, then the embedded search link document generation system 10 will initiate the search criteria dialogue with the intent of placing a search link 360 at the present location of the cursor. Alternately, if the "create link" button is pressed while text within the editing frame is selected (but no link is selected), the search criteria dialogue will still appear, but when completed the embedded search link document generation system 10 will place a search link 360 on a new line below the selected text, rather than at the same point as the cursor.

The "edit link" 330 button also calls the search criteria dialogue when depressed, but not for the purpose of creating a new search link 360. Rather, the "edit link" button is active only when an existing search link is selected. This permits a user to change the search criteria associated with a given search link 360.

The "delete" button 340 may remove any highlighted text or search links 360 when depressed.

Depressing the "test link" button 350 while a search link 360 is selected will perform the search associated with the search link, and display the results. Thus, the "test link" button 350 may be used to gain an idea of what an end user clicking in a specific search link 360 may see in terms of results.

As mentioned above, the contextual menu appears when the user right-clicks a mouse button within the editing pane 310. The contextual menu contains menu items corresponding to the "create link", "edit link", "delete", and "test link" buttons. Each menu item performs the same operations as the corresponding buttons detailed above.

Creating a Search Link—the Search Criteria Dialogue

Figure 5:
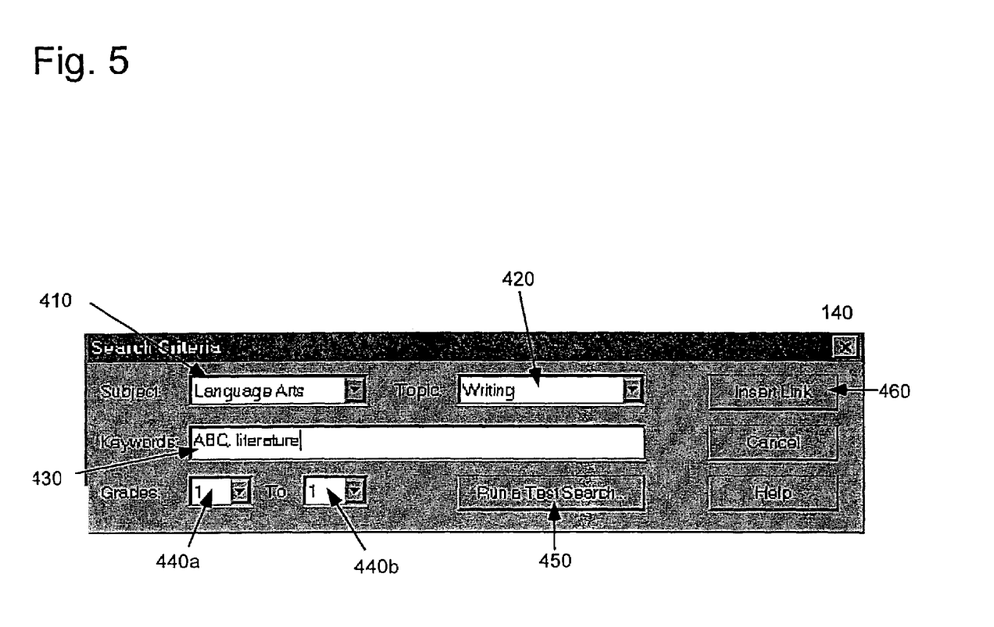
FIG. 5 depicts a screen display in accordance with an embodiment of the present invention

A user of the embedded search link document generation system 10 creates a search link through the search criteria dialogue 140, as shown in FIG. 5. The search criteria dialogue 140 permits a user to specify various search parameters used by the search engine 15 when crawling for relevant documents, and embodies the search criteria dialogue 14 shown on FIG. 2. In the exemplary embodiment, the search criteria dialogue contains five search parameters: subject, topic, keywords, minimum grade, and maximum grade. Each requires a user-specified value in order to successfully create a link, and each will be discussed in turn. Alternate embodiments may contain different search criteria.

The subject box 410 contains a drop-down list of all GEM approved subject (L1) entries, except the "All" subject. The GEM L1 entries are: Arts; Educational Technology; Foreign Language; Health; Language Arts; Mathematics; Philosophy; Physical Education; Religion; Science; Social Studies; and Vocational Education. The "All" subject encompasses every one of the twelve previously enumerated subjects.

Similarly, the topic box 420 contains a drop-down list of all topics associated with the subject shown in the subject box 410. Thus, the contents of the topic box drop-down menu change according to the contents of the subject box. Additionally, the topic box 420 contains a "none of these" entry, which permits the user to ignore the topic classification if necessary. Alternate embodiments may contain an "all of these" entry in the topic box in order to permit the selection of all topics.

The keywords box 430 accepts text input from a user, rather than providing a pull-down menu. The embedded search link document generation system 10 uses the text input as a filter. For a document to satisfy the search criteria, any text in the keywords box 430 must also be present in the document. A user may input phrases by placing the phrase within quotation marks.

Grade levels for a search are specified through the use of a minimum grade box 440$a$ and a maximum grade box 440$b$. Both the minimum grade box and the maximum grade box contain a drop down menu listing all grades from first grade through twelfth grade. If both the minimum grade box 440$a$ and the maximum grade box 440$b$ are set to the same number, then only documents suitable for a single grade will be returned. Otherwise, all documents suitable for any grade between those specified in the minimum grade box and the maximum grade box which also meet all other search criteria will be returned.

Once all search criteria are specified, the user may initiate a test search. The test search button 450, when depressed, instructs the search engine 15 to search the site catalog 18 for all documents meeting the parameters specified in the search criteria dialogue 140. This process is more thoroughly discussed with respect to FIG. 7.

Once all relevant documents have been retrieved, the embedded search link document generation system 10 presents the documents to the user. This permits the user to see what results will be generated by a third party accessing a search link 360 with parameters corresponding to those specified in the search criteria dialogue 140. Additionally, the user may designate one or more results as "preferred links." Briefly, a preferred link will always be returned at the top of the results list generated for the search link corresponding to the designated preferred link. The concept of preferred links is more thoroughly discussed with respect to FIG. 7.

Finally, the "insert link" button 460 allows a user to create a search link 360. The newly created search link is inserted into the document being edited wherever the cursor is located within the editing pane 310. Any time the search link is accessed by a user, the embedded search link document generation system 10 initiates a search of the site catalog 18 through the search engine 15, with parameters corresponding to those specified in the search criteria dialogue 140 at the time the link was created. Thus, slightly different results may be returned each time a user accesses a search link, depending on what documents constitute the site catalog 18 at any given moment. Preferred links associated with a search link 360 will always be returned in the results list, however.

Saving a Link-Enabled Curriculum Standards Document

Figure 6:
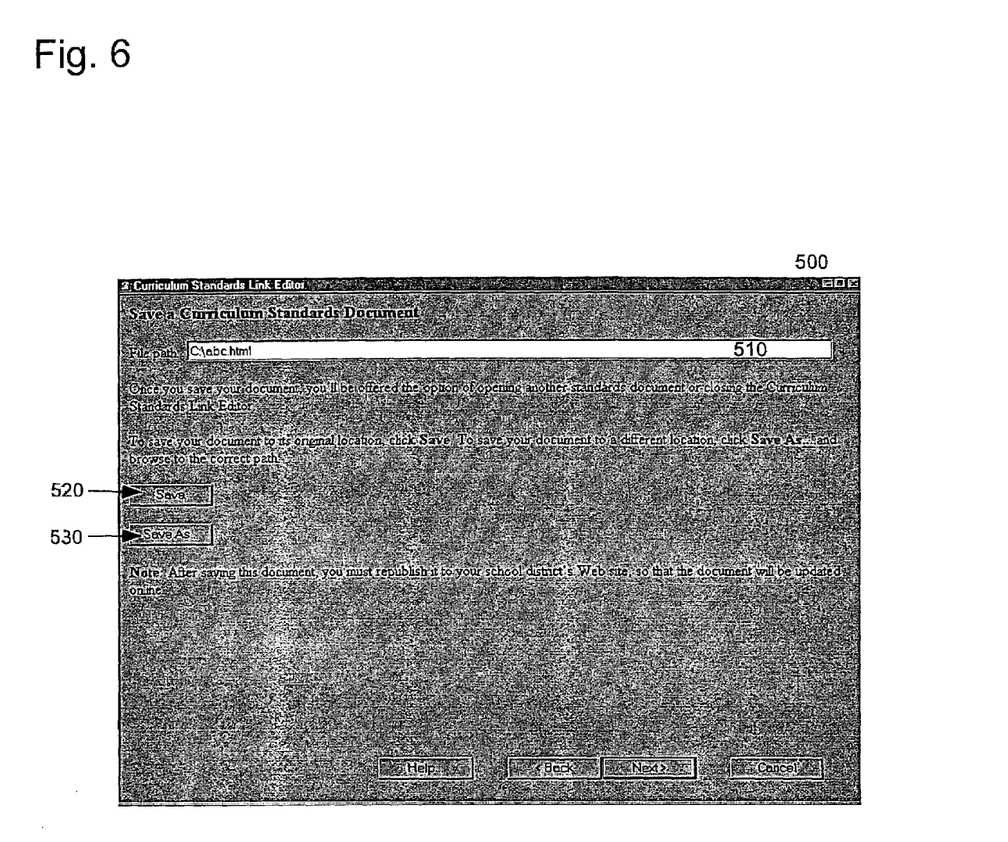
FIG. 6 depicts a screen display in accordance with an embodiment of the present invention.

FIG. 6 displays the save screen 500. A user may save the embedded search link document (in our example, an HTML-formatted CSD) from this screen in order to preserve any search links 360.

The save screen 500 includes a file path box 510, a save button 520, and a save as button 530. The user enters the location to which he wishes to save the CSD in the file path box 510. Once entered, the user may save the document to this location by pressing the save button 520. Alternately, the user may save the CSD with a different filename, or in a different location, by pressing the save as button 530. Pressing the save as button opens a new window displaying the file path specified in the file path box 510, and showing all files present at this location. In the exemplary embodiment, the user is also provided with a graphical means for moving about the file structure in order to specify a new save location.

Logical Operation of the Embedded Search Link Generation Routine

Figure 7:
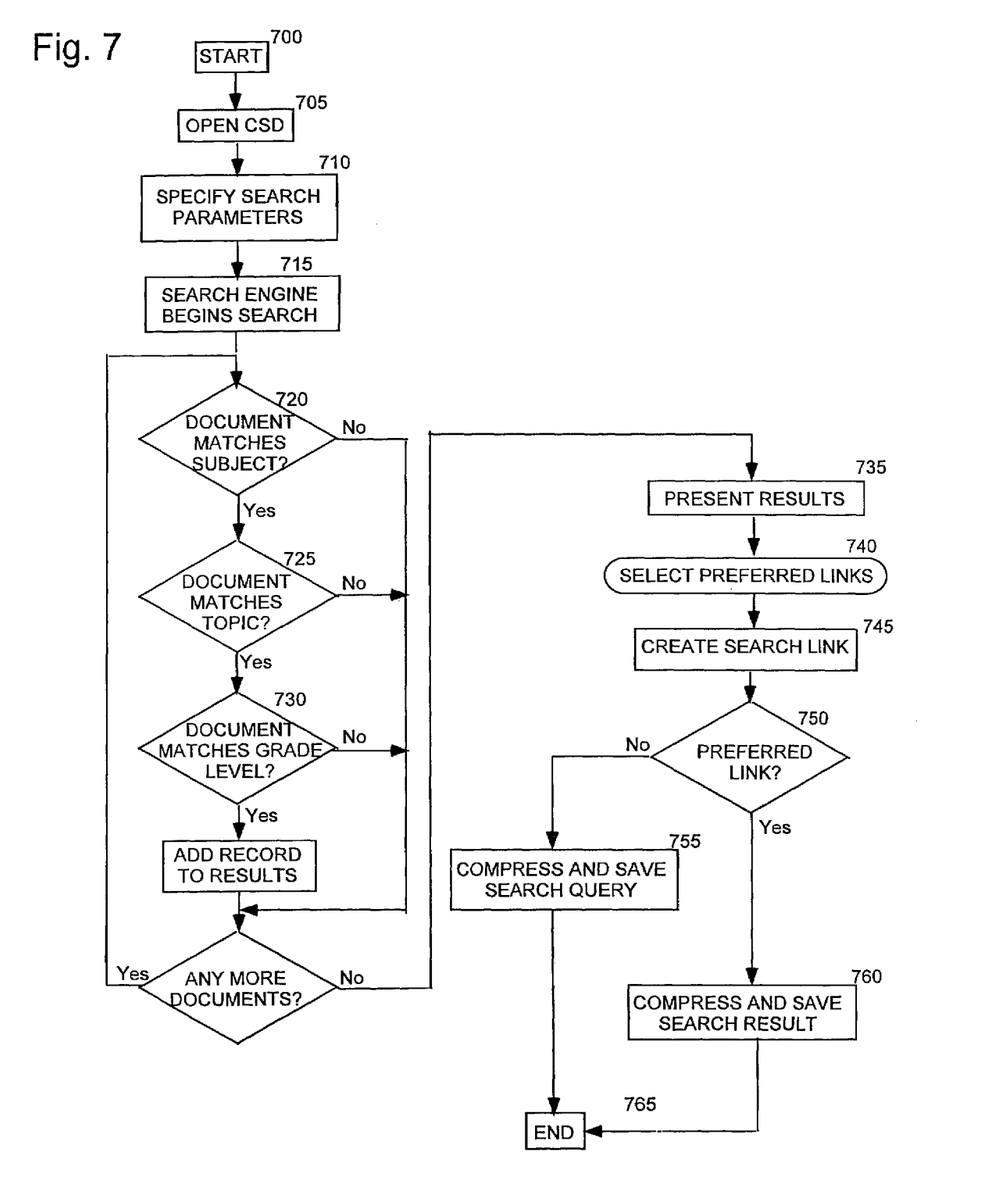
FIG. 7 is a logic flow diagram of a flowchart illustrating a method for creating an embedded search link document.

FIG. 7 displays a flowchart depicting the logical operation of the embedded search link generation routine. This routine is carried out whenever a user creates a search link 360 from the search criteria dialogue 140, or when a user initiates a test search through the use of the test search button 450.

The routine begins in start state 700. From start state 700, step 705 is accessed, wherein the embedded search link document generation system 10 opens a curriculum standards document. The CSD is presented to the user in the editing pane 310.

In response to user input indicating that the user wishes to edit or create a search link 360, step 707 is accessed. In step 707, the embedded search link document generation system 10 displays the search criteria dialogue 140. The user may then specify his desired search parameters, as shown in step 710. The various search parameters implemented in the exemplary embodiment have been thoroughly discussed with respect to FIG. 5.

Following step 710, step 715 is accessed, wherein the search engine 15 begins the specified search. The process comprising the search for relevant documents fulfilling the search criteria is shown in steps 720 through 733. In step 720, the search engine examines a document within the site catalog 18 to determine whether the document matches the user-specified subject. If not, then step 733 is accessed. If so, then step 725 is entered. In step 725, the search engine 15 determines whether the document being examined matches the topic specified in the topic box 420 of the search criteria dialogue 400 (shown in FIG. 5). If no match exists, then step 733 is entered. If, however, the document satisfies the topic criterion, then step 730 is entered. In step 730, the search engine examines the document to determine whether the information contained therein is appropriate for the grade range specified in the search criteria dialogue 400. If the document falls between the minimum grade and the maximum grade selected, then step 732 is accessed and the embedded search link document generation system 10 adds the document to the results list. Otherwise, step 732 is skipped and step 733 is executed.

In step 733, the search engine 15 determines whether any more documents exist to be searched in the site catalog 18. If so, then steps 720 through 732 are repeated. Otherwise, the search subroutine ends and step 735 is accessed.

In step 735, the embedded search link document generation system 10 presents the results of the search subroutine to the user. In the exemplary embodiment, the results are compiled into a results list and presented in a separate window on the display screen 47, although alternate embodiments may present results individually, or within the same window containing the curriculum standards document. Once the user receives the results list in step 735, step 740 is accessed.

In step 740, the embedded search link document generation system 10 awaits user selection of preferred links. A user may designate any or all of the links presented in the results list as a "preferred link." Preferred links differ from ordinary search results in two ways. First, preferred links are displayed at the top of any results list generated in response to an end user accessing a search link. Second, the document to which a preferred link leads is compressed and saved with the parent CSD.

After step 740, step 745 is accessed. In step 745, the user may create a search link 360 embodying the search parameters shown in the search criteria dialogue 400. A user creates a search link in the exemplary embodiment by pressing the "insert link" button 460 in the search criteria dialogue 400. The embedded search link document generation system 10 inserts an HTML-formatted hyperlink in the CSD at the location of the cursor in the editing pane 310. Step 750 is then entered.

In step 750, the embedded search link document generation system 10 determines whether any preferred links are attached to the search link 360. If not, then step 755 is accessed. If one or more preferred links have been designated, then step 760 is entered. In step 760, the embedded search link document generation system 10 compresses and saves the preferred search links (as document URLs). This ensures that whenever the search link 360 is accessed, the preferred links will be returned as part of the results set regardless of whether the site catalog 18 has been updated since the search link was created. Step 755 is entered next.

In step 755, the search query is compressed and saved as a portion of the CSD. By saving the search query, later users accessing the newly created search link 360 will activate a search employing the same parameters originally specified by the link creator (or, the present user) in the search criteria dialogue 400. This ensures that later users will retrieve results from the site catalog 18 according to the link creator's wishes. Note that the results seen by a later user may vary in terms of actual documents retrieved from the site catalog, because the site catalog is periodically updated. These updates may eliminate some records, and add others. Thus, the specific documents can vary widely. Following step 755, end state 765 is entered and the routine terminates.

End Use of an Embedded Search Link Document

Once the embedded search link document generation system 10 creates an embedded search link document, end users may access and use the document. In order to make the results referenced by search links in the embedded search link document readily available to end users of the exemplary embodiment, the end user must be able to access the Internet. That is, in order to properly employ embedded search links, an end user of the embedded search link document typically opens the document in a web browser on a computer connected to the Internet. This permits the search links to properly access the site catalog 18 in order to execute embedded searches.

Figure 8:
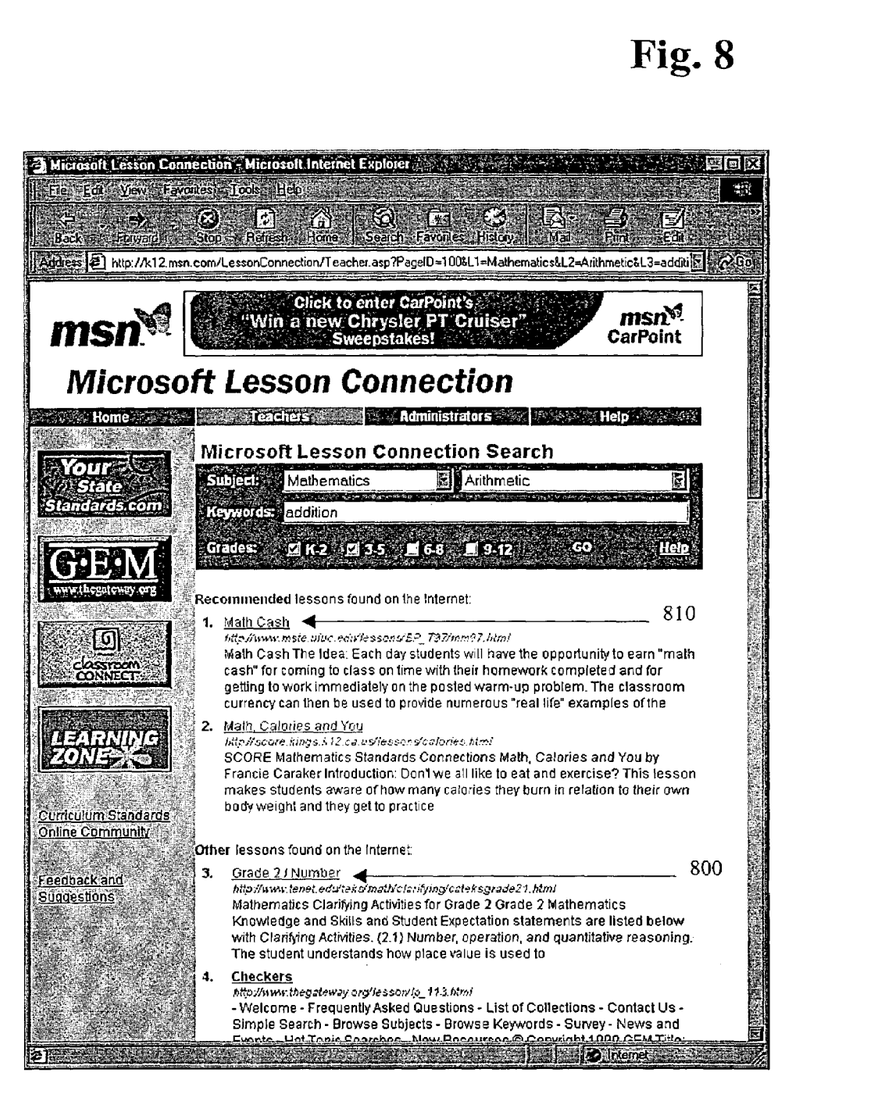
FIG. 8 depicts a screen display in accordance with an embodiment of the present invention.

FIG. 8 displays an end user view of the results of accessing an embedded search link. In the exemplary embodiment, the site catalog 18 is located on a remote computer. When an end user clicks or otherwise accesses an embedded search link 360, the embedded search link document generation system 10 contacts the remote computer and passes search criteria to the search engine 15, which in turn retrieves all matching records 810 from the site catalog 18. These records are returned to the local client 12, and are displayed to the end user. In the event that one or more preferred links are associated with the embedded search link 360, the returned preferred links 810 are added to the top of the results list before the list is shown to the end user.

Figure 9:
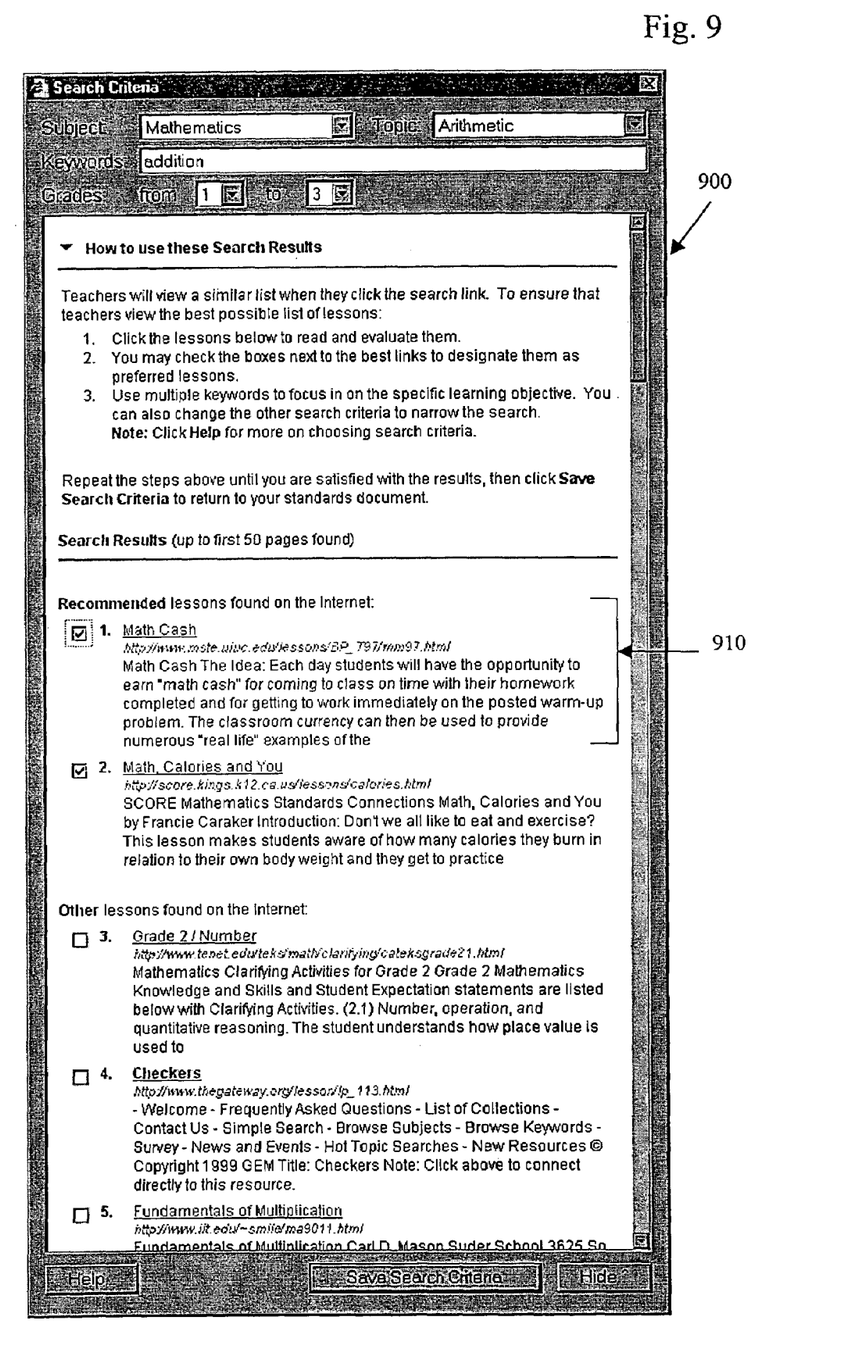
FIG. 9 depicts a screen display in accordance with an embodiment of the present invention.

Alternately, the creator of the embedded search link document generation system 10 (referred to as the "user" in the above discussion of creating an embedded search link document, insofar as the creator used the embedded search link document generation system 10 to produce the embedded search link document) may publish the document on a third party server designed to collect and store various embedded search link documents. A standalone search criteria dialogue and the links to third party CSDs may be accessed from the Lesson Connection Website, as shown in FIG. 9.

In the exemplary embodiment, the "Microsoft Lesson Connection Website" categorizes lesson plans in the site catalog 18 according to the GEM taxonomy and provides a direct search interface 900 and links to third party CSDs 910 containing embedded search links on third party servers. In this manner, teachers seeking new lesson plans may find matching documents not only by selecting links in locally edited CSDs but also by selecting search links in third party CSDs or by employing a standalone version of the search criteria dialogue 900, as shown in FIG. 9.

Preferably, access to the Lesson Connection Website is via the World Wide Web, although alternate embodiments may include a search site accessible via ftp, or other Internet protocols well known to those skilled in the art.

CONCLUSION

The embedded search link document generation system 10 may include additional functionality not herein specifically described. For example, the system may allow a user to process multiple types of documents beyond those specifically enumerated. The embedded search link document generation system 10 may also accept display search results in varying manners, including in a dedicated window, or by confidence ranking, and so on. Many other modifications and additional features will become evident in view of the preceding description of the embodiments of the invention. It should be understood, therefore, that the foregoing relates only to certain embodiments of the invention, and that numerous changes may be made therein without departing from the spirit and scope of the invention as defined by the following claims.

What is claimed is:

1. A method for creating an embedded search link document, comprising the steps of:
    accessing a genesis document;
    performing a test search of a document source to identify test search results that satisfy a plurality of search parameters, whereby said test search is initiated by activating a test search control that causes a search engine to search the document source for all documents relevant to the plurality of search parameters, and wherein documents included on the document source can change over time;
    in response to performing the test search, retrieving the test search results;
    presenting the test search results to a user for a determination as to whether the plurality of search parameters should be adjusted to satisfy an intended use by a different user who will use the plurality of search parameters to obtain search results by accessing a search link created by the user; and
    in response to the determination that the test search results returned using the plurality of search parameters are satisfactory, embedding the search link having the plurality of search parameters into the genesis document to create the embedded search link document, the search link being operative, when activated, to initiate a search of the document source for search results that match the search parameters and to retrieve the search results, the search results that are returned potentially changing over time as the documents included on the document source change.

2. The method of claim 1, wherein a test search query based on the search parameters is formed for performing the test search of the document source, further comprising the step of:
    compressing and storing the test search query as a portion of the genesis document so that activating the search link causes the test search query to be accessed and used for performing the search of the document source.

3. The method of claim 1, wherein the embedded search link document comprises an interactive lesson plan.

4. The method of claim 1, wherein the genesis document comprises a curriculum standards document.

5. The method of claim 1, wherein the document source comprises a computer network.

6. The method of claim 1, wherein the document source comprises a site catalog.

7. The method of claim 1, further comprising the steps of:
    receiving filtered test search results;
    designating at least one of the filtered test search results as a preferred link; and
    compressing and storing as a portion of the genesis document, a document identifier corresponding to the preferred link.

8. The method of claim 1, wherein the embedded search link document is stored on an Internet-accessible computer.

9. The method of claim 8, wherein the step of accessing the genesis document comprises the step of retrieving the genesis document from a remote location.

10. The method of claim 7, wherein the filtered test search results are stored as a site catalog, and
wherein the search link is operative, when activated, to initiate a search of the site catalog for the search results matching the search parameters.

11. The method of claim 1, further comprising the steps of:
creating a search catalog from the test search results;
filtering the search catalog to form a site catalog comprising those test search results that are most relevant to a particular context of the search parameters;
after creation of the embedded search link document, receiving a command for activating the search link; and
in response to the command, retrieving the search results from the site catalog.

12. The method of claim 1, wherein the genesis document is HTML-formatted.

13. The method of claim 7, wherein the preferred link is placed first within the search results.

14. The method of claim 1, wherein the search parameters relate to a subject, a topic, a minimum grade level, and a maximum grade level.

15. The method of claim 14, wherein the subject comprises a pre-approved level one entry, the topic comprises a pre-approved level two entry, the minimum grade level comprises a first number ranging from 1 to 12, and the maximum grade level comprises a second number ranging from 1 to 12.

16. The method of claim 7, wherein a Boolean filter is used to determine the filtered test search results.

17. The method of claim 16, wherein the Boolean filter classifies each of the search results based on the presence of positive words and negative words, positive words indicating that the search result corresponds to a particular context of the search parameter and negative words indicating that the search result does not correspond to the particular context of the search parameter.

18. A computer readable medium having stored thereon computer executable instructions for performing the method of claim 1.

19. A computer readable medium having stored thereon computer executable instructions for performing the method of claim 11.

20. A system for creating an embedded search link document, comprising:
a memory for storing a genesis document and machine instructions;
an input device for inputting a series of a plurality of search parameters;
a communications device for communicating with a remote server, the remote server being in communication with a document source, wherein the document source includes a plurality of documents, and wherein the documents comprising the plurality of documents can change over time;
a processor in communication with the memory, the input device and the communications device, for transmitting a request to the remote server for a test search of the document source based on the plurality of search parameters, such that all documents relevant to the plurality of search parameters are retrieved in response to the test search of the document source;
wherein the processor is further operable to execute the machine instructions stored in the memory, causing the processor to:
display test search results received from the remote server in response to the test search on a display device, enabling a user to determine whether the plurality of search parameters should be adjusted to satisfy an intended use by, a different user who will use the plurality of search parameters to obtain search results by accessing a search link created by the user; and
in response to a determination that the test search results returned using the plurality of search parameters are satisfactory, embed the search link having the plurality of search parameters into the genesis document to create the embedded search link document, the search link being operative, when activated, to initiate a search of the document source for search results matching the search parameters and to retrieve the search results, the search results that are returned potentially changing over time as the documents on the document source change.

21. The system of claim 20, wherein the request for the test search includes a test search query that is based on the search parameters;
wherein the machine instructions further cause the processor to compress and store the test search query as a portion of the genesis document; and
wherein activation of the search link causes the test search query to be accessed and used for performing the search of the document source.

22. The system of claim 20, wherein the embedded search link document comprises an interactive lesson plan.

23. The system of claim 20, wherein the genesis document comprises a curriculum standards document.

24. The system of claim 20, wherein the document source comprises the Internet.

25. The system of claim 20, wherein the document source comprises a site catalog.

26. The system of claim 20, wherein the remote server is operable for filtering the test search results through a filtering function, producing filtered test search results; and
wherein the machine instructions further cause the processor to:
receive the filtered test search results from the remote server via the communications device;
designate at least one of the filtered test search results as a preferred link; and
compress and store a document uniform resource locator (URL) corresponding to the preferred link as a portion of the genesis document.

27. The system of claim 26, wherein the remote server is further operable for storing the filtered test search results as a site catalog; and wherein the search link is operative, when activated, to initiate a search of the site catalog for the search results matching the search parameters.

28. The system of claim 26, wherein the preferred link is placed first within the search results.

29. The system of claim 26, wherein the filtering function comprises a Boolean filter.

30. The system of claim 29, wherein the Boolean filter is operable for classifying each of the search results based on the presence of positive words and negative words, positive words indicating that the search result may be relevant to a particular context of the search parameter and negative words indicating that the search result may be irrelevant to the particular context of the search parameter.

31. The system of claim 20, wherein the search parameters relate to a subject, a topic, a minimum grade level, and a maximum grade level.

32. The system of claim 31, wherein the subject comprises a pre-approved level one entry, the topic comprises a pre-approved level two entry, the minimum grade level comprises a first number ranging from 1 to 12, and the maximum grade level comprises a second number ranging from 1 to 12.

* * * * *